United States Patent [19]

Umeda

[11] Patent Number: 4,642,800
[45] Date of Patent: Feb. 10, 1987

[54] NOISE SUBTRACTION FILTER

[75] Inventor: Takato Umeda, Berkeley, Calif.

[73] Assignee: Exploration Logging, Inc., Sacramento, Calif.

[21] Appl. No.: 769,129

[22] Filed: Aug. 26, 1985

Related U.S. Application Data

[63] Continuation of Ser. No. 410,573, Aug. 23, 1982, abandoned.

[51] Int. Cl.$^4$ .......................... G01V 1/40; H03K 5/01
[52] U.S. Cl. ......................................... 367/85; 367/83; 364/422
[58] Field of Search ................................. 367/83–85, 367/45, 59, 60; 364/422, 575, 734

[56] References Cited

U.S. PATENT DOCUMENTS

| | | | |
|---|---|---|---|
| 4,215,425 | 7/1980 | Waggener | 367/83 |
| 4,513,403 | 4/1985 | Troy | 367/83 |
| 4,523,108 | 6/1985 | Niiho et al. | 356/5 |

Primary Examiner—Nelson Moskowitz
Attorney, Agent, or Firm—Christie, Parker & Hale

[57] ABSTRACT

A filter for use in filtering noise from cyclical signals having a data component and a noise component in which a predetermined number of the cyclical signals are averaged to produce an average signature signal. The average signature signal is updated each cycle to produce a current updated average signature signal, and the current cyclical signals and the current updated average signals are subtracted from one another to remove the noise component and produce a residual signal which contains the data component. The time frames of the current cyclical signals and the current updated average signals are adjusted to be equal so as to enable point by point subtraction.

As an additional feature, the updating of the average pump signature combines a portion of the last average pump signature with a portion of the last residual signal.

11 Claims, 9 Drawing Figures

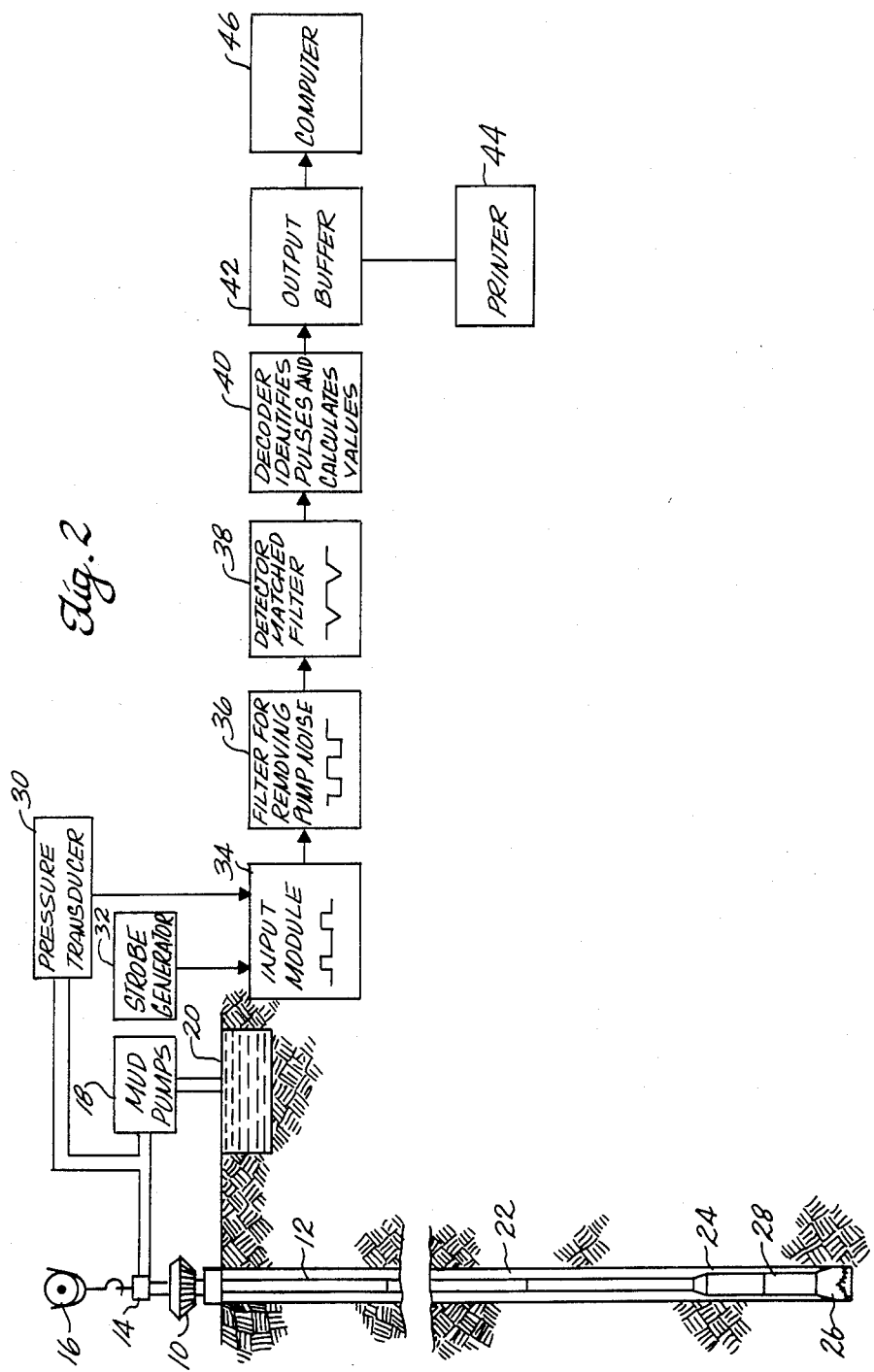

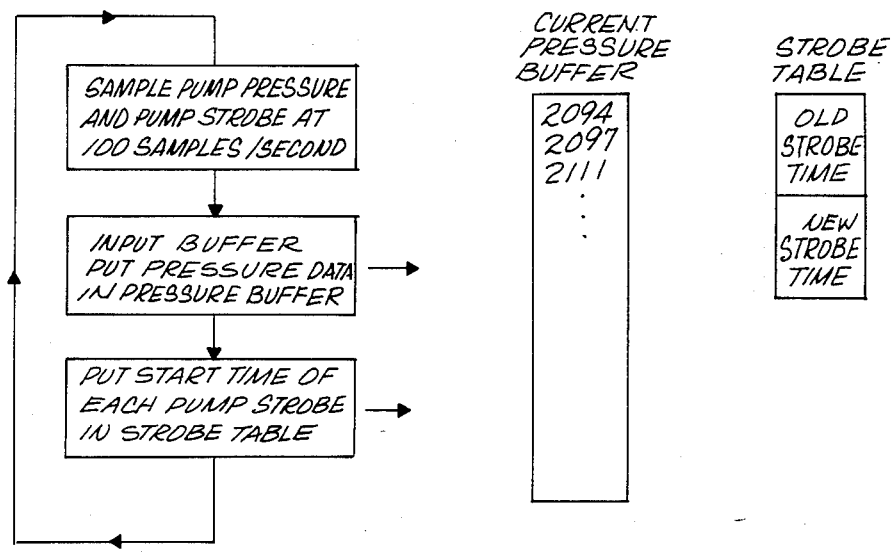
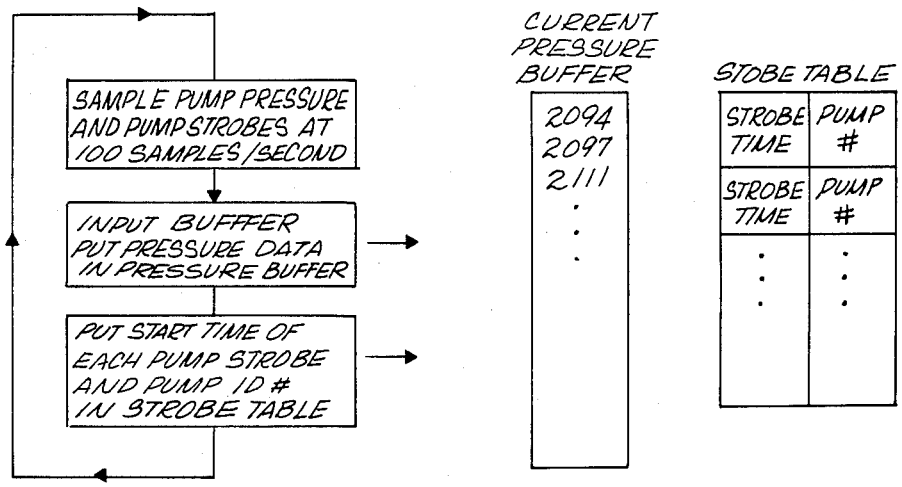

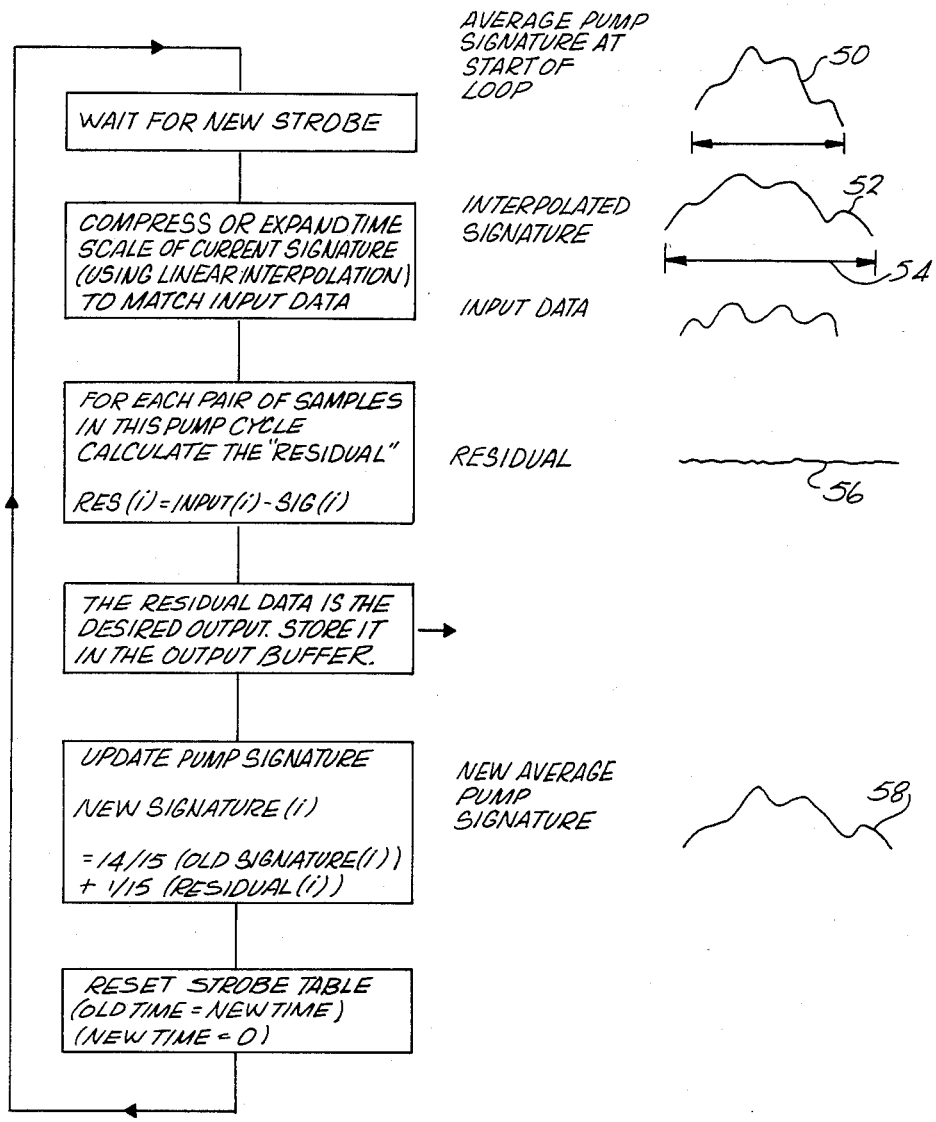

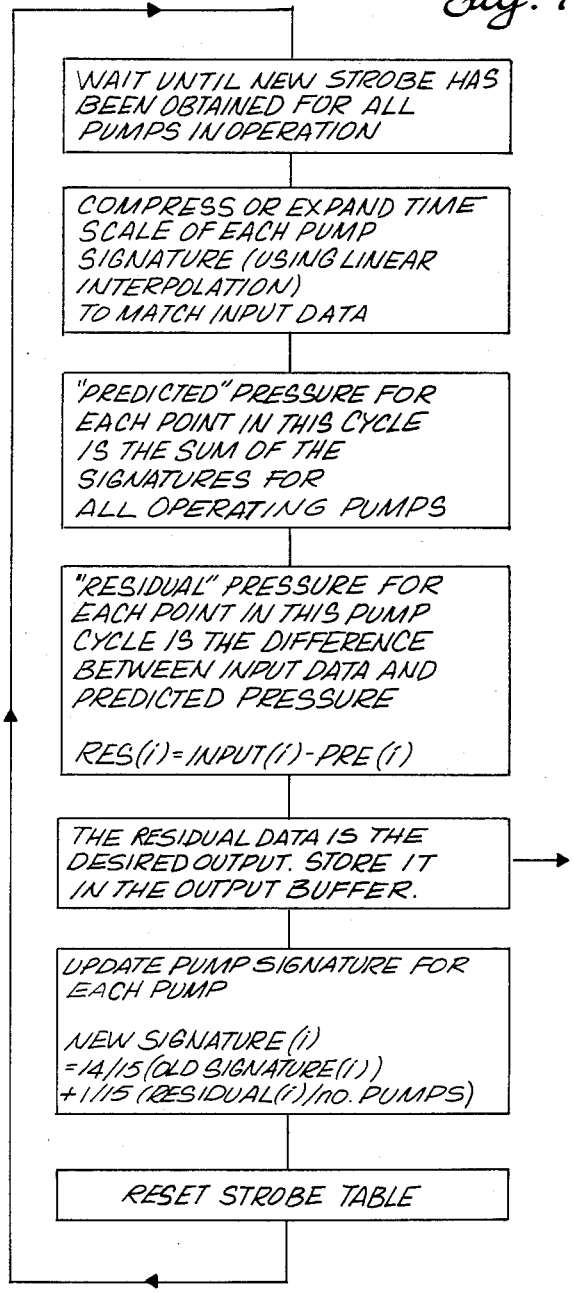

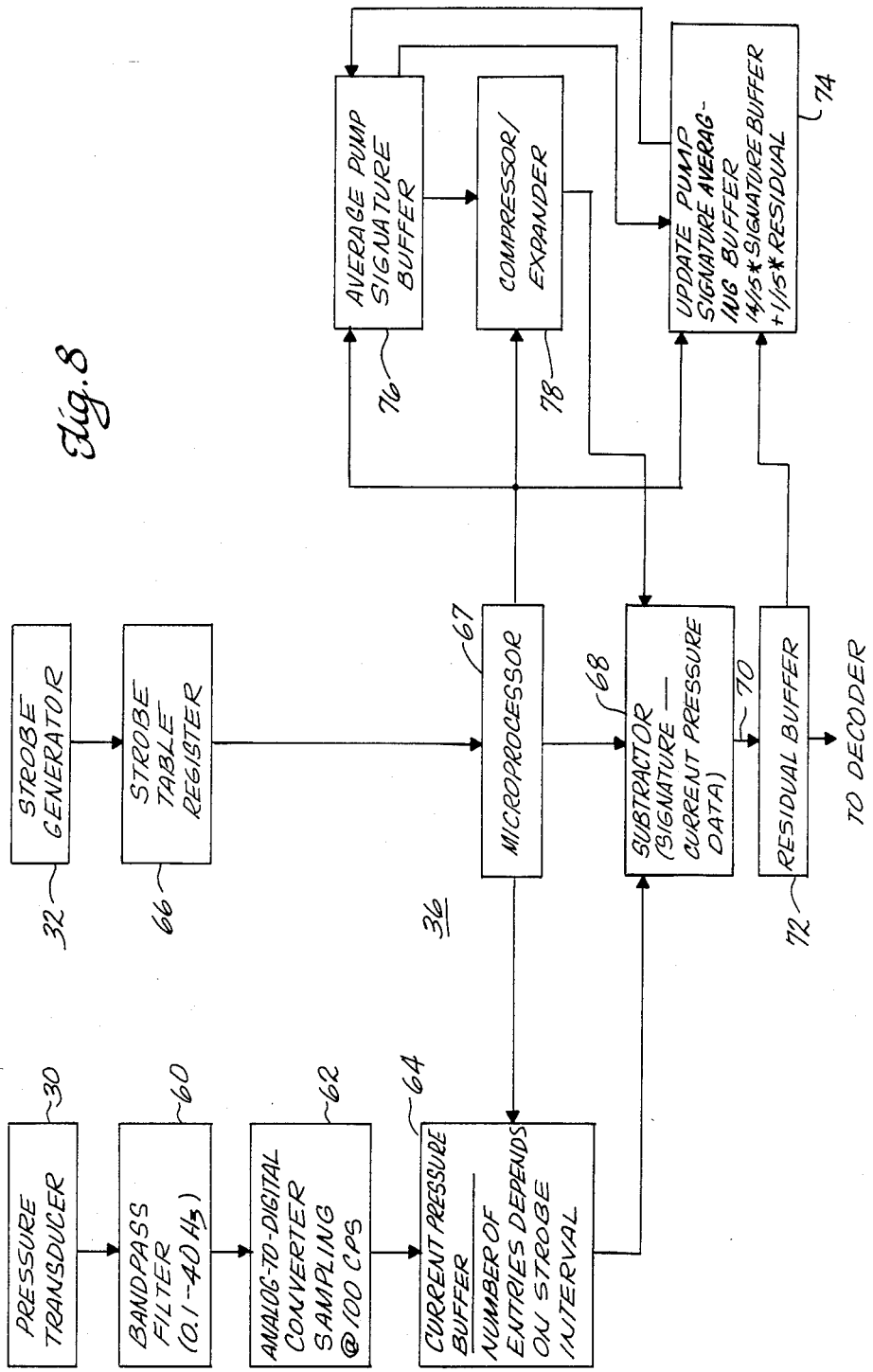

NOISE SUBTRACTION FILTER

CROSS REFERENCE TO RELATED APPLICATIONS

This is a continuation of application Ser. No. 410,573 filed Aug. 23, 1982, now abandoned.

FIELD OF THE INVENTION

This invention relates to methods and apparatus for filtering noise signals that occur on a periodic basis. The invention is particularly suitable for use in filtering pump noise in telemetry systems in which data is transmitted in the form of pressure pulses through the fluid that is employed in drilling a well.

In well drilling the oscillating component of the pump pressure signal that is generated by the pump or pumps is often much larger than the pulses that are telemetered through the well drilling fluid, and hence it is essential that the pump noise be removed so that the telemetered pulses can be recognized and detected.

THE PRIOR ART

The prior art arrangements for filtering pump noise include frequency responsive electric networks, and subtraction circuitry in which pump noise is largely cancelled out by subtracting a preceding pump noise signal from a current pump noise signal.

In order for a frequency responsive electric network to function satisfactorily the frequencies of the pump noise signals must be significantly different the frequencies of the telemetered pulse signals. Hence, such filters are satisfactory only when the frequency characteristics of the telemetered data pulse signals are different from the frequency characteristics of the pump noise signals.

Subtraction circuitry in which a preceding pump noise signal is subtracted from a current pump noise signal has been limited to the use of a single pump because the noise signals of plural pumps interact and beat with one another to produce combined signals which change with time.

SUMMARY OF THE INVENTION

The aforesaid difficulties are overcome in the present invention by continuously developing and updating an "average pump signature" over a certain number of pump cycles so that the average pump signature is representative of the pressure signals that are produced by the pump during a predetermined interval of time, e.g. one pump cycle. The time scale of the average pump signature is continuously compared with the time scale of the current pump noise signal, and if necessary, the average pump signature is compressed or expanded in time by linear interpolation to correspond with the time scale of the current pump noise signal. The resultant average pump signature is then subtracted from the current pressure noise signal to leave a "residual" signal which contains the telemetered data pulses.

The updating of the average pump signature combines a portion of the last average pump signature with a portion of the last residual signal. The data pulses have little effect upon the average pump signature since that signature is obtained by averaging over several pump cycles and hence the probability of several data pulses occurring in synchronism with the pump pressure signals is very low.

This method and apparatus functions satisfactorily when plural pumps (such as three) are used simultaneously because the pump noise signals are represented by a sum of the average pump signatures.

The invention may be carried out by programming a computer or by circuit hardware.

BRIEF DESCRIPTION OF THE DRAWINGS

FIG. 2 illustrates how encoded pressure pulses may be processed at the surface to provide a read-out of the parameters that are measured downhole;

FIG. 4 illustrates the sequence of operations during data acquisition while operating with one pump;

FIG. 5 illustrates the sequence of operations during the subtraction procedure while operating with one pump;

FIG. 6 illustrates the sequence of operations during data acquisition while operating with multiple pumps;

FIG. 7 illustrates the sequence of operations during the subtraction procedure while operating with multiple pumps;

FIG. 8 shows circuit hardware that may be employed to carry out the steps of FIGS. 4 and 5 with a single pump.

DESCRIPTION OF THE PREFERRED EMBODIMENTS

Pulse Encoding

Copending application Ser. No. 405,063 discloses and claims methods and apparatus for encoding and synchronizing data in a pulse telemetry system.

Figure 1:
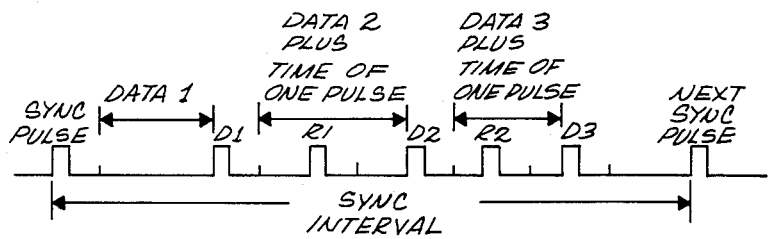
FIG. 1 illustrates one form of a pulse code for producing pressure pulses that may be employed in telemetering data from the interior of a well to the surface.

FIG. 1 illustrates one of the encoding arrangements that is disclosed in that application. A pulse is considered to be a drop in pressure for a fixed period of time (e.g. 0.5 second) followed by one second of normal pressure. Synchronization pulses are produced at the beginning of each synchronization interval. The time intervals between the successive data pulses (D1, D2, D3) in a sync interval provides an analog measurement of the data parameters that are to be telemetered to the surface, and three data words may be produced during each synchronization interval.

Redundant pulses (R1, R2) are provided midway in time betweeen adjacent pairs of data pulses. The redundant pulses provide a means for discriminating between data pulses and noise pulses. Thus, data pulses can be considered to be data pulses (D1, D2, D3) only if a redundant pulse exists midway in time between adjacent pairs of data pulses.

Each sync interval is a sub-frame of information, and a selected number of sub-frames (e.g. 11) comprise a frame which constitutes one complete set of data.

During certain sub-frames a particular pattern of frame identification pulses is produced and telemetered to the surface to enable the apparatus at the surface to identify the sequence of data transmission.

Processing the Encoded Data

FIG. 2 illustrates one arrangement for processing the encoded data.

The drilling rig includes the usual rotary table 10, kelly 12, swivel 14, traveling block 16, mud pumps 18, mud pit 20, and a drill string made up of drill pipe sections 22 secured to the lower end of the kelly 12 and to the upper end of a drill collar 24 and terminating in the drill bit 26. The downhole pulse encoding apparatus and a valve for producing negative pressure pulses in the drilling fluid may be located in a drill collar 28 located above the drill bit 26.

A pressure transducer 30 is coupled to the conduit for the drilling fluid and it senses the negative pressure pulses that are produced downhole.

The mud pumps 18 produce pressure signals that have certain characteristics which constitute noise with respect to the data pulses.

A strobe generator 32 produces strobe signals that represent the time required for each cycle of each mud pump.

The signals from the pressure transducer 30 and the strobe generator 32 are applied to an input module 34 where the pressure signals are passed through a low-pass filter and then are averaged in pairs and the average is stored 50 or 100 times per second in a buffer until required by the filter module 36.

The filter module 36 is the subject of this invention. It serves to remove or reduce the noise signals produced by the mud pumps 18.

The output of the filter 36 is applied to a detector 38 which employs a matched filter to enhance the detectability of the encoded pulses.

The pulse signature used in the matched filter is a first order approximation to a rectangular pulse which has been high-pass filtered at a frequency corresponding to 1/(4*pulse width) hz. The use of a high-pass filter allows a simple level detector to be used for pulse identification.

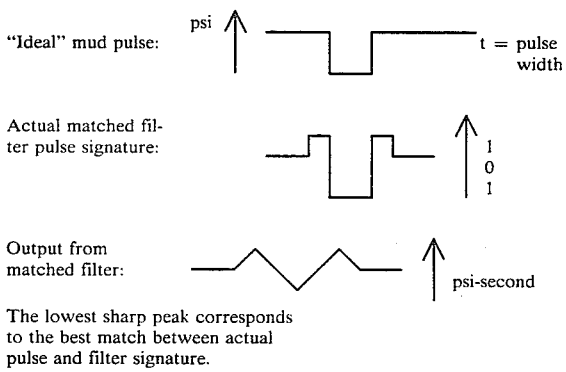

"Ideal" mud pulse:

Actual matched filter pulse signature:

Output from matched filter:

The lowest sharp peak corresponds to the best match between actual pulse and filter signature.

A high speed FFT convolution technique is used to implement the matched filter convolution. In operation, the convolution is performed approximately once every 20 seconds whenever data is made available by the filter module 36. The output of the matched filter is stored in a "Detection Buffer" which can hold data for more than one complete sub-frame. (If the sub-frame is 60 seconds long, the buffer is set up to hold data for a 64-second interval.)

A simple level detection scheme is performed on the (overlapping) 64-second intervals. (The detection level is a user-controlled parameter.) Pulse position (time) is assigned at the pulse minimum; pulse height and width are also determined. The decoded pulses are stored in a "Pulse Table" for use by the decoder module 40. If pulse width does not fit within certain predefined limits, then the pulse is considered to be "noise" and discarded.

Sub-frame sync pulses are found by a search of invariant pulses of one-minute periods over the last three minutes. When these pulses are found, the detection buffer is shifted in time to ensure that the start of the sub-frame will be located at the start of the buffer. The time of the sync pulse is recorded for use by the decoder module 40.

The first time a downhole Tool starts up downhole, a search for frame ident pulses is enabled within the detector module 38 before the sub-frame sync pulses are identified. This enables the apparatus to synchronize on the first sub-frame that is transmitted from downhole.

The output of the detector 38 is applied to a decoder 40 which identifies the pulses and calculates the values.

This module operates once every sub-frame. Every time the detection buffer is filled, the decoder module 40 uses the information within the Pulse Table set-up by the detector module 38 to identify pulse types.

Sync pulses are first identified by their position in time. Frame ident pulses are then searched for, again at predefined time positions. All pulses are allowed a small error in time setup as a user setpoint called "Pulse Position Variance" (typically 0.1 second). All remaining pulses are searched to identify the "groups of three equally spaced pulses" which identify data and redundant pulses.

Once the pulses are identified sub-frame numbers and data values can be calculated and supplied to the output buffer 42 via the Decoder Buffer.

The output buffer 42 transmits the data within the decoder 40 to a computer 46 or a printer 44 for setting forth the data parameters that are transmitted to the surface.

The Pump Noise Subtraction Filter

Figure 3:
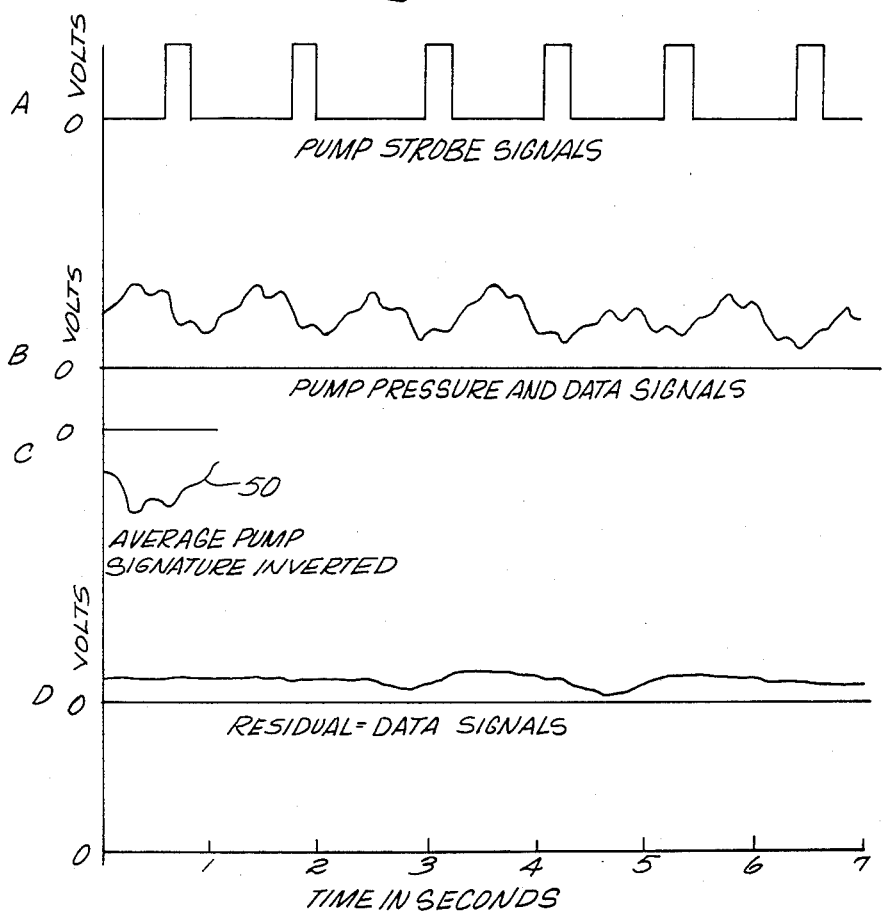
FIG. 3 illustrates four of the signals that are produced by the apparatus of this invention.

FIG. 3A illustrates the pump strobe signals when one pump is operating. Each strobe signal is produced at the time of one pump cycle.

FIG. 3B illustrates the pump pressure signals when one pump is operating. These signals are much larger than the data pulses, and hence the pump noise signals must be removed or reduced in order to recognize and detect the data pulses.

FIG. 3C illustrates an "average pump signature" 50 that is obtained over a certain number of pump cycles. It is shown inverted with respect to the pressure signals of FIG. 3B to illustrate the subtraction process.

The currently updated average pump signature of FIG. 3C is subtracted from each cycle of the pump pressure signals of FIG. 3B to expose a residual signal constituting the data signals, as illustrated in FIG. 3D.

There are two processes running simultaneously during the pump noise filter operation. The first is the data acquisition, shown in FIG. 4 (this is the input module 34 of FIG. 2); the second is the subtraction process, shown in FIG. 5 (this is the filter module 36 of FIG. 2).

In a computer based process the acquisition process will typically operate on "interrupts" generated by an external clock, with the subtraction process being the "main line" program.

FIG. 4 shows pressure data sampled at 100 times per second being stored into an input buffer. The current pressure data is transferred periodically to the current pressure buffer. Every time the leading edge of a Pump Strobe signal is recognized an entry is made in the Strobe Table.

The pump noise subtraction process of FIG. 5 starts every time a new Pump Strobe entry is made in the Pump Strobe Table. Since the pump speed can vary with time, the period of one cycle will change and therefore the total number of samples in one cycle will change. The current pump signature 50 may require to be compressed or expanded to match the latest pump period. The pump signature 52 illustrates the circumstance where the current pump signature is expanded so that the time base 54 is equal to the time of the current pump cycle. After this process there will be the same number of samples in the Pump Signature as there are in the current pump cycle.

The output of the pump noise subtraction filter is the "residual" 56 which is the difference between the pump pressure signals of the latest pump cycle and the current average pump signature.

The Pump Signature is updated by adding a fraction of the residual (known as the Weighting factor) to a fraction of the current signature. (Typically 1/15 and 14/15 respectively.) This produces a new average pump signature 58. As the portions of the fractions are changed the filter can be made to distribute its "weight" over many cycles (and reduce the effect of any noise, including data pulses, on the signature) or fewer cycles, to make the signature more responsive to changes in pump signature.

The Strobe Table and Pressure Buffer are next reset to make space for new data.

When the filter is started (from scratch) the average Pump Signature is assumed to be zero for all points in the cycle. Normal operation of the filter will cause the signature to gradually take on the characteristics of the actual pump signature.

For a weighting factor of W ($0<W<1$) the Calculated Pulse Signature will be the following if the last pump cycle was cycle "i":

Signature=W(Residual of Pump
Cycle(i))+$W^2$(Residual of
Cycle(i−1))+$W^3$(Residual of Cycle (i−2))+ . . .

FIGS. 6 and 7 show the changes required to operate the model using multiple pumps (simultaneously).

FIG. 6 shows that the Pump Strobe Table must now identify the pump number as well as the time of arrival of the Pump Strobe signal.

FIG. 7 shows that the subtraction process must wait until a pump strobe signal has been obtained from each operating mud pump. The "predicted" pressure is the sum of all the signatures of the operating pumps, taking into account the relative phase position of each pump.

The residual pressure is now the difference between the current pressure data and the predicted pressure. As before the residual pressure is the desired output from the filter.

The signatures are updated as before except that only 1/(total pumps operating) of the residual is assigned to each signature.

The Strobe Table and Pressure Buffer are reset to end the process.

The algorithm for the pump noise subtraction filter described above is set forth in detail in Appendix I hereto.

FIG. 8 illustrates how the input module 34 and filter 36 for removing pump noise can be implemented for one pump with circuit hardware.

Signals from the pressure transducer 30 are applied through a bandpass filter 60 to an analog-to-digital converter 62 where the pressure signals are sampled at 100 cycles per second. The pressure signals are averaged in pairs and the average is stored 50 times a second in a current pressure buffer 64. The current pressure buffer 64 accepts data from the analog-to-digital converter 62 during the interval of time between successive pump strobe signals (FIG. 3A).

A certain number of memory locations for data words in the current pressure buffer 64 are filled with the digital data when the pump strobe signals are one second apart. However, the pump speed can vary with time, and the period of one pump cycle will change. Therefore the number of samples in one pump cycle will change. The current pressure buffer 64 will accept up to five seconds of digital data, so as to encompass all practical pump speeds.

The pump strobe signals of FIG. 3A are produced by the strobe generator 32 and applied to a strobe table register 66 which enters the successive strobe times. The register 66 is coupled to a microprocessor 67 which controls the sequence of operations. The microprocessor 67 controls the transfer of data from the buffer 64 and the transfer of signatures from buffers 74 and 76.

One subtraction process is initiated each time that a new entry is made in the strobe table register 66. Upon the occurrence of a new entry in the strobe table register 66, the data in the current pressure buffer 64 and the current average pump signature are shifted to the subtractor circuit 68 which subtracts one from the other to produce at its output 70 the residual signal of FIG. 3D. The residual signal is stored in a residual buffer 72 until it is called for by the detector 38.

The average pump signature is obtained by averaging the pressure signals that are produced over a selected number of the current pump cycles in an update pump signature averaging buffer 74.

Preferably, the average pump signature is also updated periodically by the addition of a fraction of the current residual signal in the residual buffer 72 to a fraction of the current average pump signature. The fraction of the current residual signal that is added to the current average pump signature is called the "weighting factor". The proportions of the fractions can be changed to achieve particular results. For example, a large number of pump cycles may be employed in developing a signature wherein the effect of any noise, including mud pulses, is reduced. If fewer pump cycles are employed in developing the signature, the average pump signature is more responsive to changes in the pump signature.

Typical operating parameters for producing an updated average pump signature employ 14/15 of the old average pump signature plus 1/15 of the current residual signal.

The averaging of the pressure signals that are produced during a predetermined number of pump cycles and the addition of a fractional part (e.g. 14/15) to a fractional part (e.g. 1/15) of the residual signal is performed by the update pump signature averaging buffer 74. The current residual signal from the residual buffer 72 is shifted into the averaging buffer during each pump cycle where the 14/15 and 1/15 addition is effected. The resultant current average pump signature is shifted into the average pump signature buffer 76.

A compressor/expander 78 serves to compress or expand the time scale of the current average pump signature in buffer 76 so that it corresponds to the time scale of the current pressure in buffer 64.

Subtraction occurs on a data word by data word basis. Thus the appropriate word from the pump signature buffer is subtracted from the current word in the data buffer.

The word selected from the average pump signature buffer 76 is selected by the compressor/expander 78 under the control of microprocessor 67 according to the following formula:

$$m = s(i/n)$$

where m is the index of the word selected from the pump signature buffer, s is the total number of words in the pump signature buffer, i is the index of the current word in the data buffer 64 and n is the length, in words of the pressure data stored in the data buffer 64.

When the filter operation commences the average pump signature is zero for all points in the cycle. As the initial current pressure cycles are stored in the buffer 64, they are shifted through the subtractor 68 and the residual buffer 72 into the buffer 74 where the pump signature gradually takes on the characteristics of the actual average pump signature. The average pump signature is continually updated by the buffer 74 and the current average pump signature is stored in the buffer 76. The proper data points in the buffer 76 are selected by the compressor/expander 78 and shifted into the subtractor 68 where the current average pump signature and the current pump pressure are subtracted from one another to produce the residual signal that is shifted into the buffer 72.

Figure 9:
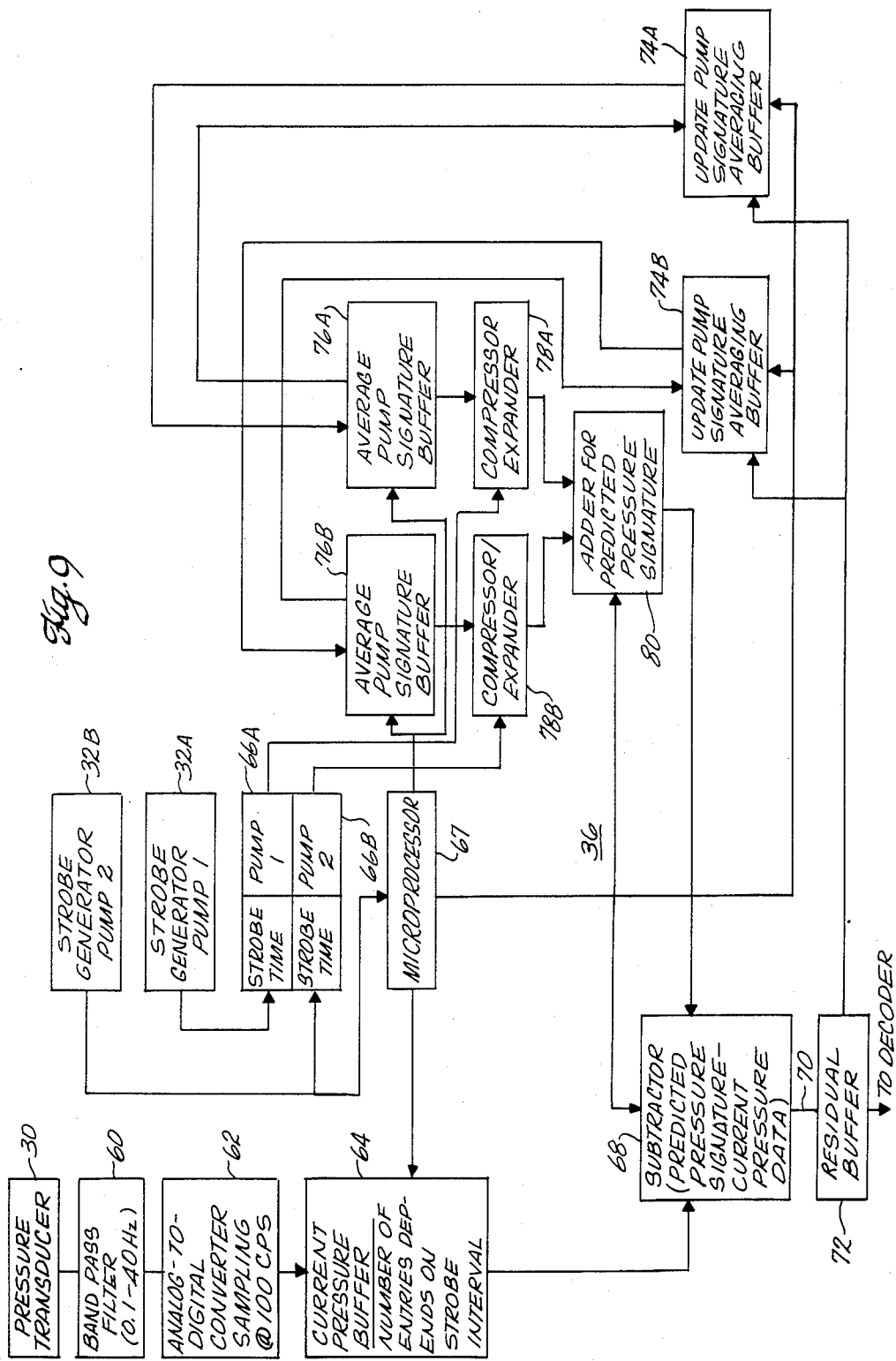
FIG. 9 shows circuit hardware that may be employed to carry out the steps of FIGS. 6 and 7 with multiple pumps.

FIG. 9 illustrates how the filter 36 for removing pump noise can be implemented for two or more pumps with circuit hardware.

The current pressure data input circuitry is the same as that shown on FIG. 8.

An average pump signature is obtained for each pump, with the circuitry for the respective pumps being identified by the letters A and B.

The outputs of the compressor/expanders 78A and 78B are applied to an adder 80 which produces the sum of all of the signatures of the operating pumps, taking into account the relative phase position of each pump.

The signatures are updated as before except that only 1/(number of pumps operating) of the residual is assigned to each signature.

The residual pressure is then the difference between the current pressure data in buffer 64 and the predicted pressure signature in adder 80.

It will be apparent that the noise subtraction filter 36 may be expanded to function with any desired number of pumps.

APPENDIX 1

Detailed Description of the Filter Section Algorithm

The filtering algorithm employed in this section is the pump phase partition model, and the assumptions upon which this model is based have been stated in the description of the pump noise subtraction filter. The implementation details are described in the following:

SYMBOL DEFINITIONS

P.in(i) = Input pressure data at the i-th sample.
S(j,i) = Input strobe data at i-th sample from pump j ($1 \leq j \leq 3$)
Is(j,k) = Sample index for k-th strobe from pump j
P.pred(i) = Predicted pressure for the i-th sample
P.sig(j,m) = Pump j's AC pressure profile at its m-th stroke phase position. $0 \leq m \leq$ Signature size—1. The signature size is 128.
P.mean(i) = Predicted mean pressure for the i-th sample.
P.res(i) = Residual pressure at the i-th sample = P.in(i) — P.pred(i). This is the filter sections output to the detector.
P.ave(j) = Pump j's average signature value.
P.ran(i) = Computer generated random pressure data.
U(j) = Pump j's signature update weight; $0 < U \leq$ Update weight limit.

The filter section receives pressure data, P.in(i), and pump strobe indices, Is(j,k), from the input section. Strobe data, S(j,i), has been evaluated for strobe sample index (strobe occurrence time) by the Input Section. The kth index has been assigned for pump j at data sample i $$Is(j,k) = i$$

whenever $$S(j,i) + S(j,i-1) + S(j,i-2) - S(j,i-3) - S(j,i-4) - S(j,i-5) > \tfrac{3}{4} * \text{Strobe height } (j)$$

and $$\text{Minimum } (S(j,i), S(j,i-1), S(j,i-2)) < \text{Maximum } (S(j,i-3), S(j,i-4), S(j,i-5))$$

(The strobe height is a user controlled parameter.)

This particular algorithm searches for the leading edge of a strobe, and it is somewhat noise tolerant due to the two tests described above.

The q-th pump's contribution to the pressure for the i-th sample is referenced in its pump signature table, P.sig, by linearly interpolating the index, m(q), for the sample index bracketed by the indices of two nearest strobes. That is, $$m(q) = \text{Signature size} * (i - Is(q, kq-1)) / (Is(q, kq) - Is(q, kq-1))$$

where kq is selected on the basis that $$Is(q, kq) > i \geq Is(q, kq-1)$$

This linear interpolation of the index estimates the phase of the pump.

The predicted pressure for the i-th sample is computed by summing the individual pump pressure contributions of each pump that is "in operation" to the mean pressure, P.mean(i)

$$P.pred(i) = P.mean(i) + [\text{sum q over all pumps in operation}: P.sig(q, m(q))]$$

The j-th pump is considered "in operation" if its last strobe occurred less than five seconds from the current input sample, i.e., if at the i-th sample and for last strobe index, Is(j,k), $$i - Is(j,k) < 500 (= 5 \text{ seconds})$$

If the pump is considered "off", its signature and update weight are initilized to zero.

The difference between the predicted pressure, P.pred, and the pressure input, P.in, composes the residual pressure.

$$P.res(i) = P.in(i) - P.pred(i)$$

which is passed to the detector section.

Pump signatures, P.sig(q,m(q)), are updated at every sample point by the relation $$P.sig(q,m(q)) = \frac{(P.sig(q,m(q))) * U(q) + P.res(i))/(\text{number of pumps in operation})}{\text{Maximum } (1, U(q) + 1)}$$

After a pump stroke is complete, i.e., i=Is(q,kq), the predicted mean pressure is updated by $$P.mean(i) = (P.mean(i) + P.ave(q))/2$$

where P.ave(q) is the mean value of the pump signature for q-th pump.

After the predicted mean pressure is updated, this average signature value is subtracted from the elements of the pump's signature table.

Also, the signature update weight is incremented until its maximum is reached,

U(q)=Minimum(U(q)+1, Signature Update Weight Limit)

Whenever there are no pumps in operation and for five seconds after this conditions ceases to exist, the filter algorithm generated random pressure data for the residual pressure so that sample timing can be maintained, $$P.res(i) = P.ran(i).$$

What is claimed is:

1. A method of filtering noise from signals having a data component and a cyclical noise component having a substantially unidirectional polarity comprising averaging a predetermined number of the cyclical signals to produce an average signature signal in synchronism with the cyclical noise component, updating the average signature signal each cycle to produce a current average signature signal, and subtracting the current cyclical signals and the current average signature signals from one another to produce a residual signal which contains the data component, with the average signature signal being updated by adding a fraction of the residual signal to a fraction of the current average signature signal.

2. A method of noise subtraction for use in processing data that is telemetered by pressure pulses that are transmitted through well drilling fluid that is circulated by pumping in repetitive cycles, comprising producing composite signals that are representative of the pressure changes in the fluid having a data component that is representative of the telemetered data and having a cyclical noise component of substantially unidirectional polariaty that is produced by the pumping of the fluid, producing an average signature signal in synchronism with the cyclical noise component that is representative of the average of said composite signals over a selected number of current pumping cycles, and subtracting the current composite signals and the current average signature signal from one another to cause the cyclical noise components that are produced by pumping to cancel leaving a residual signal that contains the data component.

3. The method of claim 2 wherein the time frame of the signals is adjusted so that the composite signals and the average signature signals have the same time frame with respect to the pumping cycles.

4. The method of claim 2 wherein the average signature signal is produced by adding a portion of the current pump signature to a portion of the current residual signal.

5. The method of claim 2 wherein the average signature signal is produced by adding 14/15 of the current pump signature to 1/15 of the current residual signal.

6. A noise subtraction filter comprising means for producing a repetitive signal having a data component and a noise component having a substantially unidirectional polarity, means synchronized with said noise component for continuously averaging a predetermined number of the current repetitive signals to produce an average signature signal, means for updating the average signature signal periodically to produce a current average signature signal, and means for subtracting the current repetitive signals and the current average signature signal, whereby the noise component in the current repetitive signal is substantially cancelled leaving a residual signal which contains the data component.

7. A noise subtraction filter for use in processing data that is telemetered through well drilling fluid that is circulated by pump means that operates in repetitive cycles, comprising means adapted to be coupled to the well drilling fluid for producing composite signals representative of pressure changes in the fluid having a data component that is representative of the data that is telemetered through the well drilling fluid and having a cyclical noise component of substantially unidirectional polarity that results from the changes in pressure that are produced by the pump means, means synchronized with the pump cycles for averaging a predetermined number of said composite signals during a predetermined number of pump cycles to produce an average signature signal, and means for subtracting the current composite signals and the current average signature signal from one another to cause the cyclical noise components to cancel leaving a residual signal which contains the data component.

8. A noise subtraction filter for use in processing data that is telemetered through well drilling fluid that is circulated by pump means that operates in repetitive cycles in which the pressure in the well drilling fluid is increased in periodic cycles to cause cyclical noise, comprising means coupled to the well drilling fluid for producing composite signals representative of pressure changes in the fluid having a data component that is representative of the data that is telemetered through the well drilling fluid and having said cyclical noise that results from the changes in pressure that are produced by the pump means, means synchronized with the repetitive cycles of said pump means for producing an average pump signature signal that is representative of the average of said composite signals during a predetermined number of pump cycles, and means for subtracting the current composite signals and the current average signature signal from one another to cause the cyclical noise components that are produced by the pump means to cancel leaving a residual signal at the output of the subtracting means that contains the data component.

9. The apparatus of claim 8 wherein the means for substracting the current composite signals and the current average signature signals includes means for compressing or expanding the time frame of one of the signals to cause both of the signals to have the same time frame.

10. The apparatus of claim 8 wherein the average pump signature signal is produced by adding a portion of the current pump signature to a portion of the current residual signal.

11. The apparatus of claim 8 wherein the average pump signature signal is produced by adding 14/15 of the current pump signature to 1/15 of the current residual signal.

* * * * *

UNITED STATES PATENT AND TRADEMARK OFFICE
CERTIFICATE OF CORRECTION

PATENT NO. : 4,642,800

DATED : February 10, 1987

INVENTOR(S) : TAKATO UMEDA

It is certified that error appears in the above-identified patent and that said Letters Patent is hereby corrected as shown below:

```
Col. 1, line 31, after "different" insert -- from --
Col. 7, line 38, change "on" to -- in --
Col. 8, line 18, change "kth" to -- k-th --
Col. 8, line 30, change "<Maximum" to -- >Maximum --
Col. 9, line 13, change "conditions" to -- condition --
Col. 9, line 61 (claim 2, line 9), change "polariaty" to
        -- polarity --
```

Signed and Sealed this

Tenth Day of May, 1988

Attest:

DONALD J. QUIGG

Attesting Officer

Commissioner of Patents and Trademarks